United States Patent
Hirzmann et al.

(10) Patent No.: US 7,481,450 B2
(45) Date of Patent: Jan. 27, 2009

(54) VEHICLE STEERING WHEEL WITH AN AIRBAG MODULE

(75) Inventors: Guido Hirzmann, Sailauf (DE); Lars Wuschik, Leidersbach (DE); Heinz Lefringhausen, Mainhausen (DE); Norbert Staudt, Aschaffenburg (DE); Klaus Weigand, Steinau (DE)

(73) Assignee: TRW Automotive Safety Systems GmbH, Aschaffenburg ( * ) Notice: Subject to any disclaimer, the term of this patent is extended or adjusted under 35 U.S.C. 154(b) by 445 days.

(21) Appl. No.: 11/284,387

(22) Filed: Nov. 21, 2005

(65) Prior Publication Data

US 2006/0113775 A1    Jun. 1, 2006

(30) Foreign Application Priority Data

Nov. 26, 2004   (DE) ................. 20 2004 018 362 U

(51) Int. Cl.
  *B60R 21/203* (2006.01)
(52) U.S. Cl. ..................... 280/731; 280/728.2
(58) Field of Classification Search ............ 280/731; 200/61.54, 61.55
   See application file for complete search history.

(56) References Cited

U.S. PATENT DOCUMENTS

| 5,331,124 | A | * | 7/1994 | Danielson ............. 200/61.54 |
| 5,398,962 | A | * | 3/1995 | Kropp .................. 280/731 |
| 5,489,806 | A | * | 2/1996 | Harris et al. ............ 307/10.1 |
| 5,576,684 | A | * | 11/1996 | Langford ............... 338/50 |
| 5,965,952 | A | * | 10/1999 | Podoloff et al. ......... 307/10.1 |
| 6,135,494 | A | | 10/2000 | Lotito et al. |
| 6,236,309 | B1 | * | 5/2001 | Haag et al. ............. 340/438 |
| 6,279,943 | B1 | * | 8/2001 | Derrick ................. 280/728.2 |
| 6,682,092 | B2 | | 1/2004 | Schutz et al. |
| 7,089,099 | B2 | * | 8/2006 | Shostak et al. ........... 701/32 |
| 2006/0028002 | A1 | * | 2/2006 | Tsujimoto et al. ........ 280/731 |

FOREIGN PATENT DOCUMENTS

| DE | 4016047 | 11/1991 |
| DE | 19625722 | 1/1998 |
| DE | 20021532 | 5/2001 |
| DE | 60010878 | 7/2005 |
| EP | 0681944 | 11/1995 |
| EP | 1074435 | 2/2001 |

* cited by examiner

*Primary Examiner*—Paul N Dickson
*Assistant Examiner*—Nicole Verley
(74) *Attorney, Agent, or Firm*—Tarolli, Sundheim, Covell & Tummino LLP

(57) ABSTRACT

A vehicle steering wheel (20) includes a movable airbag module (24) which can be depressed by a limited axial stroke for generating a horn signal. The vehicle steering wheel (20) further includes a sensor system (22*a*, 22*b*) operating in a contactless manner for determining the stroke.

8 Claims, 3 Drawing Sheets

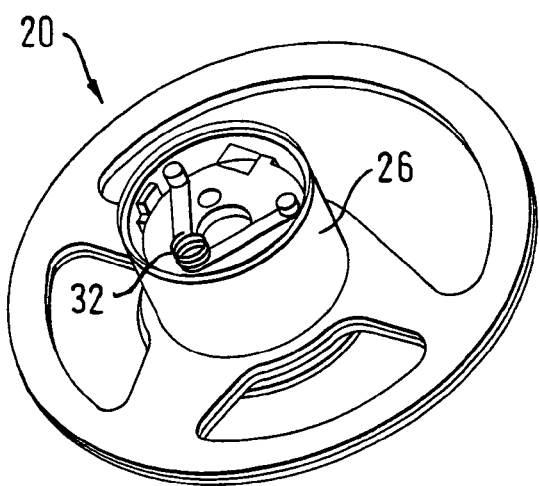
Fig. 4
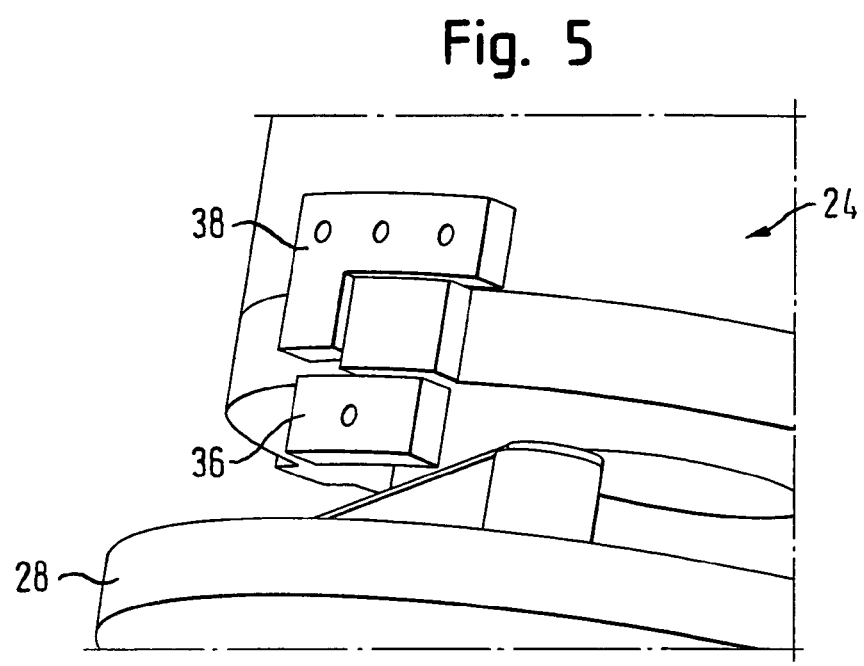
Fig. 5
Fig. 6
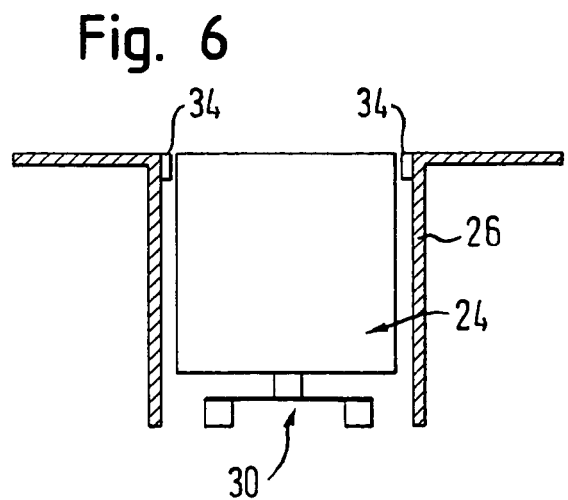

VEHICLE STEERING WHEEL WITH AN AIRBAG MODULE

TECHNICAL FIELD

The invention relates to a vehicle steering wheel comprising a movable airbag module.

BACKGROUND OF THE INVENTION

Floatingly mounted airbag modules which can be depressed by a limited axial stroke for generating a horn signal, undertake the function of a horn actuating element. Such modules are as also designated as "floating horn" modules. They have the advantage, compared with horn button switches arranged on the steering wheel, that the airbag module always keeps its central position independently of the steering wheel turning angle, so that the horn actuation in dangerous situations is simplified. The module is movable against the force of compression springs so far downwards that at least one of the contacts provided on the base of the module mounting is closed by the depressing of the airbag module.

In order to ensure a triggering of the horn in case of a decentral pressure exertion onto the airbag module, several contact sites are provided, and the airbag module must be able to tilt laterally. This requires a relatively large distance between the side wall of the airbag module and the lateral guide of the airbag mounting, which contradicts the requirement for as small gap dimensions as possible and in addition promotes undesired vibrations of the airbag module.

German Patent No. 196 25 722 shows a vehicle steering wheel with a movable airbag module which can be depressed by a limited axial stroke for generating a horn signal. The distance between the airbag module and the lateral guides of the steering structure is provided by laterally projecting extensions of the airbag module.

A further disadvantage of the hitherto conventional floating horn modules is the very costly electrical connection of the plurality of horn contacts which requires several cables and/or printed circuit boards.

It is an object of the invention to provide a vehicle steering wheel with a floating horn module which, with few components, ensures a reliable triggering of the horn.

BRIEF SUMMARY OF THE INVENTION

The steering wheel according to the invention comprises a movable airbag module which can be depressed by a limited axial stroke for generating a horn signal. The vehicle steering wheel further comprises a sensor system operating in a contactless manner is provided for determining the stroke. According to the invention, the triggering of the horn therefore does not take place by mechanical closing of contacts, but rather as a function of the stroke of the airbag module as determined by the sensor system. This has the advantage that the requirement of the plurality of horn contacts and compression springs is dispensed with. The stroke is only measured at one point which, in addition, is also virtually freely selectable. The contactless detection of the stroke has the advantage furthermore that no wear or ageing of the contacts takes place (e.g. through spark erosion).

The measurement of the stroke can be facilitated in that the airbag module is guided parallel to a steering axis of the steering wheel. The airbag module then performs an axial movement (i.e. not a tilting movement) independently of the actuation position (site of pressure exertion), such stroke being readily measurable. In addition, small gap dimensions can be achieved through the parallel guiding.

The parallel guiding of the airbag module can be achieved or at least assisted by several guide elements arranged radially between the airbag module and an airbag module mounting.

According to a first alternative, the sensor system comprises a continuous path measurement device yielding an analog output signal. The evaluation of the path measurement takes place in this case preferably in a microcontroller with which the path measurement device is connected. In the case of multifunctional steering wheels advantageously a microcontroller can be used which is already present anyhow. In such a microcontroller, the data and sequences necessary for triggering the horn can be integrated without difficulty.

According to a second alternative, the sensor system comprises a threshold value path measurement device yielding a digital output signal. This simpler and more favourably priced variant commends itself in steering wheels not including a microcontroller.

BRIEF DESCRIPTION OF THE DRAWINGS

FIG. 4 shows a perspective rear view of the steering wheel of FIG. 2;

FIG. 5 shows a perspective detail view of a stroke limiter of the steering wheel of FIG. 2;

FIG. 6 shows diagrammatically a parallel-guided floating horn airbag module;

DETAILED DESCRIPTION OF THE PREFERRED EMBODIMENT

Figure 1A:
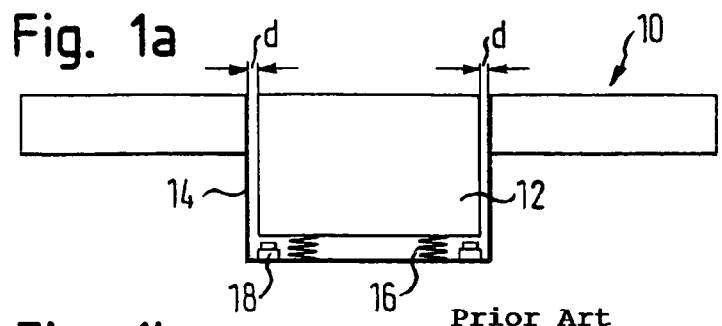
FIGS. 1a, 1b show diagrammatically a steering wheel with a floating horn airbag module according to the prior art.
Figure 1B:
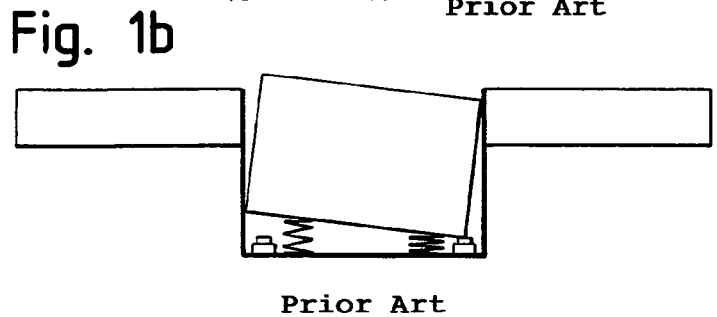
Figure 2:
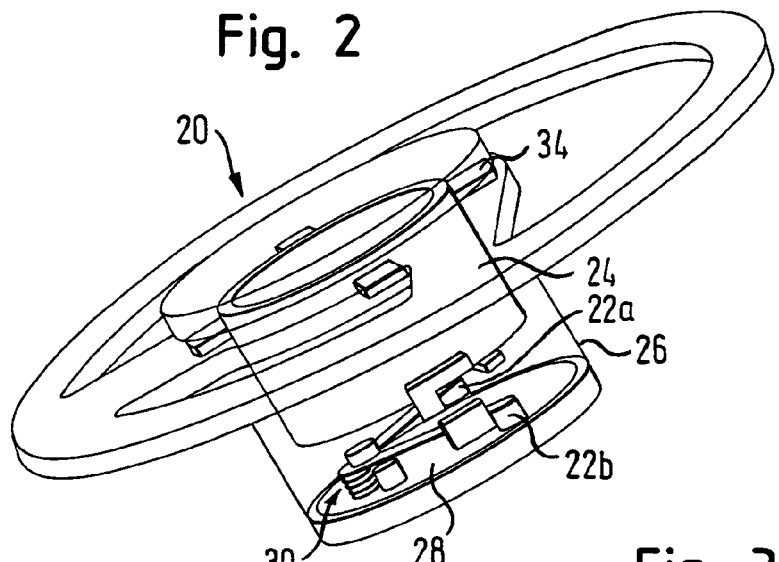
FIG. 2 shows a transparent perspective view of a steering wheel according to the invention.
Figure 3:
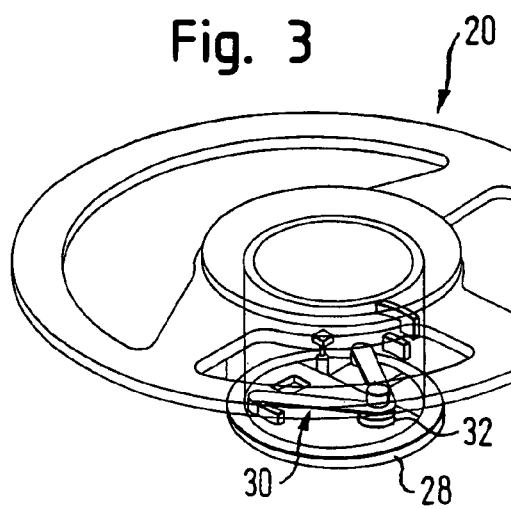
FIG. 3 shows a further transparent perspective view of the steering wheel of FIG. 2 without outer covering.

FIGS. 1a and 1b show in two-dimensional representation by way of example a conventional steering wheel 10 with a floating horn airbag module 12 in a mounting 14 of the steering wheel structure. The airbag module 12 is mounted on several compression springs 16 at an axial distance from several button switches 18. A sufficiently great radial distance d must be provided between the airbag module 12 and the mounting 14, in order to ensure an actuation of a button switch 18 (see FIG. 1b) with a decentral depressing of the airbag module 12, without the airbag module 12 jamming in the mounting 14.

FIGS. 2 to 5 show a steering wheel 20 according to the invention with a sensor device 22a, 22b operating in a contactless manner (illustrated only symbolically), for detecting the stroke in case of a depressing of the floating horn airbag module 24. The airbag module 24 is held in a cylindrical outer covering 26 (not illustrated in FIGS. 3 and 5), which is closed by a base 28 on the side facing away from the vehicle occupant. The airbag module 24 is mounted on a guide device 30, arranged on the base 28, by means of only one compression spring 32. The guide device 30 provides for a guiding of the airbag module 24 largely parallel to the axis of rotation of the steering wheel 20. The parallel guiding is assisted by several guide elements 34 provided between the airbag module 24 and the outer covering 26. The guide elements 34 can be fastened either on the airbag module 24 or on the outer covering 26. In particular, polyoxymethylene (POM), which has proved to be successful as a sliding bearing material and which is suitable for dry operation, is suited as material for the guide elements 34.

The stroke of the airbag module 24 is delimited in both axial directions by stops 36, 38, which are illustrated on an enlarged scale in FIG. 5. The shape of the stops 36, 38 which are fastened to the outer covering 26, in addition prevents a rotation of the airbag module 24.

The parallel guiding of the airbag module 24, which is illustrated diagrammatically again in FIG. 6, permits a reproducible movement of the airbag module 24, independently of the actuation position on depressing of the airbag module 24. The movement of the airbag module 24 can be reliably detected by the sensor device 22a, 22b. The particular characteristic of the sensor device 22a, 22b lies in that the stroke is detected in a contactless manner, and the horn is triggered or not depending on the determined stroke. Button switches or similar contact devices, which are possibly susceptible to wear, are not necessary. The detection of the stroke can take place either in a threshold manner or continuously, as is explained below with the aid of FIGS. 7 and 8.

Figure 7:
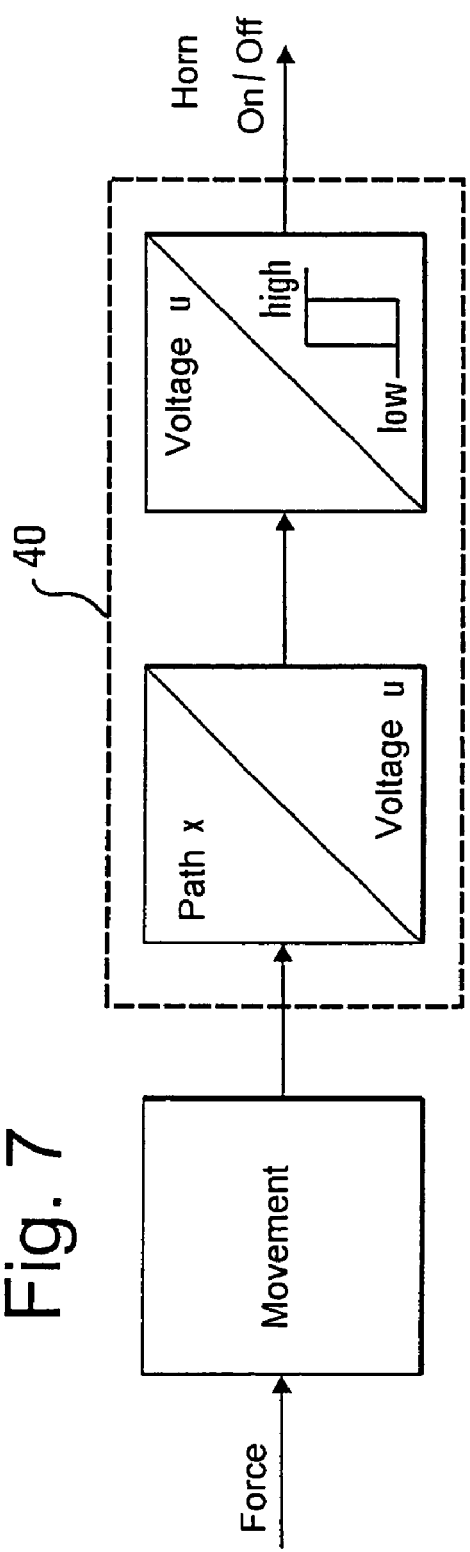
FIG. 7 shows a block diagram for a measurement of the stroke of the airbag module with a digital sensor.

FIG. 7 shows a block diagram for a threshold path measurement of the stroke of the airbag module 24 with a digital sensor system. The force exerted by the vehicle occupant by pressing onto the airbag module 24 is converted, as described above, by means of the parallel guidance into a largely linear axial movement of the airbag module 24. A path measurement device 40 determines the stroke of the airbag module and emits an altered output signal on exceeding of a given threshold value. This altered output signal can, for example, be a voltage generated by means of a Schmitt trigger on a defined level, which is increased compared with a defined initial voltage present when the threshold value has not been exceeded. The horn is then triggered or not depending on this digital output signal ("high" or "low").

Figure 8:
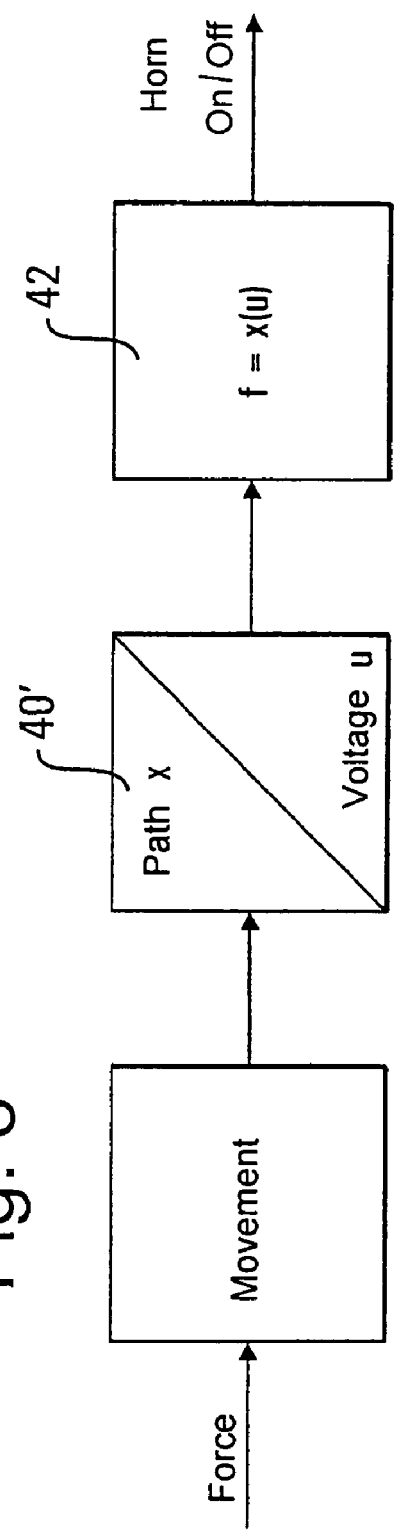
FIG. 8 shows a block diagram for a measurement of the stroke of the airbag module with an analog sensor.

FIG. 8 shows a corresponding block diagram for a continuous path measurement with an analog sensor system. The path measurement device 40' here, in contrast to the previously described threshold measurement, does not emit a digital but rather an analog output signal, changing with the stroke of the airbag module 24. This signal is supplied to a microcontroller 42 which by means of a stored mathematical function calculates therefrom the stroke of the airbag module 24. In addition to the mathematical function which describes the dependence of the stroke on the output signal of the path measurement device 40, a threshold value is also stored. If the calculated stroke of the airbag module 24 exceeds this threshold value, the horn is triggered.

The evaluation of the analog output signal of the path measurement device 40' in the microcontroller 42 is particularly simple when the path measurement device 40' generates a voltage proportional to the displacement of the airbag module 24, so that a straight line is produced as output characteristic of the path measurement device 40'. In this case, only the incline and the axis intercept of the straight line have to be determined through reference measurements of the output voltage in the non-displaced state (position of rest) and on maximum stroke of the airbag module 24 (the knowledge of the maximum stroke is presupposed).

The use of the analog sensor system has the advantage of a better resolution compared with the digital system. The position of the airbag module 24 is known at any time. Furthermore, the analog system offers the possibility of adapting the parameters deposited in the microcontroller 42, which can also take place within the scope of a self-diagnosis. The functionality necessary for triggering the horn can be integrated without difficulty into an available microcontroller of a multifunctional steering wheel.

In the following table, various possibilities are set out for a contactless measurement of the stroke of the airbag module.

| Measurement Principle | Realization | Output Signal |
| --- | --- | --- |
| Capacitive | capacity change | analog |
|  | resonant circuit damping | analog |
| Inductive | inductivity change | analog |
|  | resonant circuit damping | analog |
|  | transformatory | analog |
| Magnetic | Reed contact | digital |
|  | Hall sensor | digital |
|  | Magnetic field sensor | analog |
| Optic | light barrier | digital |
|  | lateral effect diode | analog |
|  | diode as transmitter, phototransistor system as receiver | analog |
| acoustic | ultrasonics | analog |

The invention claimed is:

1. A vehicle steering wheel, comprising a movable airbag module which can be depressed by a limited axial stroke for generating a horn signal, the vehicle steering wheel further comprising a sensor system operating in a contactless manner for determining the stroke.

2. The vehicle steering wheel according to claim 1, wherein the airbag module is guided parallel to a steering axis of the steering wheel.

3. The vehicle steering wheel according to claim 2, wherein several radially arranged guide elements are provided between the airbag module and an airbag module mounting.

4. The vehicle steering wheel according to claim 3, wherein the guide elements are made of polyoxymethylene.

5. The vehicle steering wheel according to claim 2, wherein the airbag module is mounted on a guide device by means of only one compression spring.

6. The vehicle steering wheel according to claim 1, wherein the sensor system comprises a continuous path measurement device yielding an analog output signal.

7. The vehicle steering wheel according to claim 6, wherein the path measurement device is connected with a microcontroller.

8. The vehicle steering wheel according to claim 1, wherein the sensor system comprises a threshold path measurement device yielding a digital output signal.

* * * * *